(12) United States Patent
De La Torre

(10) Patent No.: US 8,746,469 B1
(45) Date of Patent: Jun. 10, 2014

(54) FISHING ROD CADDY FOR PICKUP TRUCKS

(71) Applicant: Robert De La Torre, Newbury Park, CA (US)

(72) Inventor: Robert De La Torre, Newbury Park, CA (US)

( * ) Notice: Subject to any disclaimer, the term of this patent is extended or adjusted under 35 U.S.C. 154(b) by 0 days.

(21) Appl. No.: 13/742,200

(22) Filed: Jan. 15, 2013

(51) Int. Cl.
*A47F 7/00* (2006.01)

(52) U.S. Cl.
USPC .......................................... 211/70.8; 224/922

(58) Field of Classification Search
USPC .............. 211/70.8, 60.1, 64, 65, 67, 68, 70.2, 211/70.5; 224/922, 555, 557, 558, 563, 224/564, 567, 568; 43/21.2, 25; 248/229.1, 248/229.12, 229.15, 229.22, 229.25, 227.4, 248/228.3, 228.6, 231.41, 231.71, 231.85
See application file for complete search history.

(56) References Cited

U.S. PATENT DOCUMENTS

| | | | | |
|---|---|---|---|---|
| 1,552,535 A | * | 9/1925 | Beerstecher | 224/42.31 |
| 2,828,096 A | * | 3/1958 | Beri | 43/21.2 |
| 2,917,258 A | * | 12/1959 | Furey | 43/21.2 |
| 2,992,505 A | * | 7/1961 | Bowker | 43/21.2 |
| 3,126,180 A | * | 3/1964 | Mandolare | 248/514 |
| 3,659,369 A | * | 5/1972 | Hermanson | 43/21.2 |
| 4,671,009 A | * | 6/1987 | Faunce | 43/54.1 |
| 5,163,652 A | * | 11/1992 | King | 248/538 |
| 6,678,991 B2 | * | 1/2004 | Hooks et al. | 43/21.2 |

* cited by examiner

*Primary Examiner* — Korie H Chan
(74) *Attorney, Agent, or Firm* — Cislo & Thomas, LLP

(57) ABSTRACT

An improved fishing rod caddy that is removably mountable to the bed of a pickup truck is presented. The improved rod caddy securely holds fishing rods in a horizontal position in a pickup truck bed such that the rods are free from bending loads created by wind resistance and are protected from undue jostling, abrasion or marring during transport.

19 Claims, 5 Drawing Sheets

200~# FISHING ROD CADDY FOR PICKUP TRUCKS

BACKGROUND OF THE INVENTION

1. Field of the Invention

The present invention relates generally to the field of fishing rod carriers intended for use with motor vehicles and more particularly, to a fishing rod caddy for supporting a plurality of fishing rods in a horizontal position in the bed of a pickup truck, where the rod caddy may be easily installed in the truck bed via a simple and easy to use mounting device which attaches the caddy to one of the walls of a pickup truck's bed.

2. Background of the Invention

When a fisherman travels from his home to a lake, stream, beach or other place where he plans on fishing, one of his concerns is for the protection of his fishing equipment which includes his rods and reels. When a fishing rod is designed such that it may be broken down into multiple sections, then transport of the rod presents little difficulty. However, some styles of fishing rods are not designed to be broken down. Fly fishing rods for example are often designed as a "one-piece" rod as it is believed by many fisherman that a one-piece rod provides for a better feel while casting and fishing. Other types of rods, such as surf casting rods are inherently long. Surf casting rods are typically 12 to 14 feet in length and while surf casting rods are often designed as two-piece rods, their length even when broken down still present difficulties in transportation.

A wide variety of fishing rod holders have heretofore been designed for pickup trucks and other automobiles. With regard to pickup trucks, many of these devices are designed to be attached to the vehicle's front or rear bumper. Bumper mounted rod racks have several disadvantages. They typically employ a complicated, cumbersome attachment means for attaching to the bumper and each rod is typically held in a vertical or near vertical position creating substantial wind drag as well as jolting and bending of the rods which may lead to damage to the rods.

With regard to non-pickup truck passenger vehicles, i.e. cars, rods are frequently mounted to a roof rack. Roof racks too have inherent disadvantages. In particular, roof racks typically employ complicated mechanisms that allow the racks to attach to the rain gutter or window channel of the car. Roof racks are often time consuming to mount and remove. Although roof-rack style rod holders typically hold fishing rods in a horizontal position which respect to the roof of the car, the rods being mounted high up on the vehicle's roof are placed in the slipstream of the car and frequently accumulate excessive road grime during the journey from a fisherman's home to the place where he plans to fish. Roof racks being located on the top of a vehicle are also cumbersome to load and unload with fishing rods. Roof racks also subject the rods to the possibility of contacting low-hanging tree branches or other shrubbery adjacent to and over the roadway.

As discussed many fishing rod racks or holders which are removably attachable to vehicles exist in the art, all of which suffer from numerous drawbacks. With regard to pickup trucks, there exists a need in the art for a fishing rod caddy (or rack or holder) that is removably mountable to the bed of a pickup truck and which securely holds the rods in a horizontal position such that the rods will be free from bending loads created by wind resistance and otherwise free from undue jostling during transport. Ideally, the fishing rod caddy will also place the rods at a height in the bed that shelters the rods from the air slipstream created when the pickup truck is under way.

SUMMARY OF THE INVENTION

The present invention improves upon the prior art by providing a fishing rod caddy (or rack or holder) that is removably mountable to the bed of a pickup truck and which securely holds the rods in a horizontal position such the rods are free from bending loads created by wind resistance and are protected from undue jostling during transport. The present invention fishing rod caddy places the rods within the bed of a pickup truck such that the rods are below the upper surface of the bed rails and therefore substantially removed from air slipstream created when the pickup truck is under way.

The present invention fishing rod caddy comprises a C-channel shaped main support member that rests upon the truck bed and stands the rod carrier up a predetermined distance above the floor of the truck bed. The rod carrier is of generally rectangular shape featuring opposing longitudinal framing members connected at their ends by opposing lateral framing members. Rod support members are located adjacent to the lateral framing members at the ends of the longitudinal framing members. Attached to each rod support member is a rod holder comprising a plurality of U-shaped cutouts for the support of multiple fishing rods.

The rods may be held in the U-shaped cutouts via straps with quick disconnect buckles. The fishing rod caddy described herein may also feature a bungee cord which bears against a front portion of the reels attached to the fishing rods to be carried and thereby bias the reels to a position substantially against the U-shaped rod supports adjacent to the reels. The fishing rod caddy attaches to one side of a pickup truck bed via a clamp means of which two embodiments are disclosed.

In one embodiment, the clamping means comprises a pair of L-shaped blocks that are configured to clamp to the wall of a pickup truck bed and to be removably attachable to both the sidewall and rod caddy. In an alternative embodiment, the clamping means comprises a C-clamp arrangement that is also configured to clamp to the wall of a pickup truck bed and is also removably attachable to the both the bed wall and the rod caddy. Both clamping means make use of an angled pin or protrusion which allows the clamping means to properly positioned on the rod caddy at an appropriate height for attachment to the bed wall of a pickup truck.

In a preferred installation, the fishing rod caddy is intended to be oriented longitudinally within a pickup truck bed such that the handle ends of the rods are located proximally to the cab of the pickup truck, and consequently the tip ends of the rods are located proximally to the tailgate of the truck. This orientation may be reversed if desired by a user.

DETAILED DESCRIPTION OF THE PREFERRED EMBODIMENTS

Figure 1:
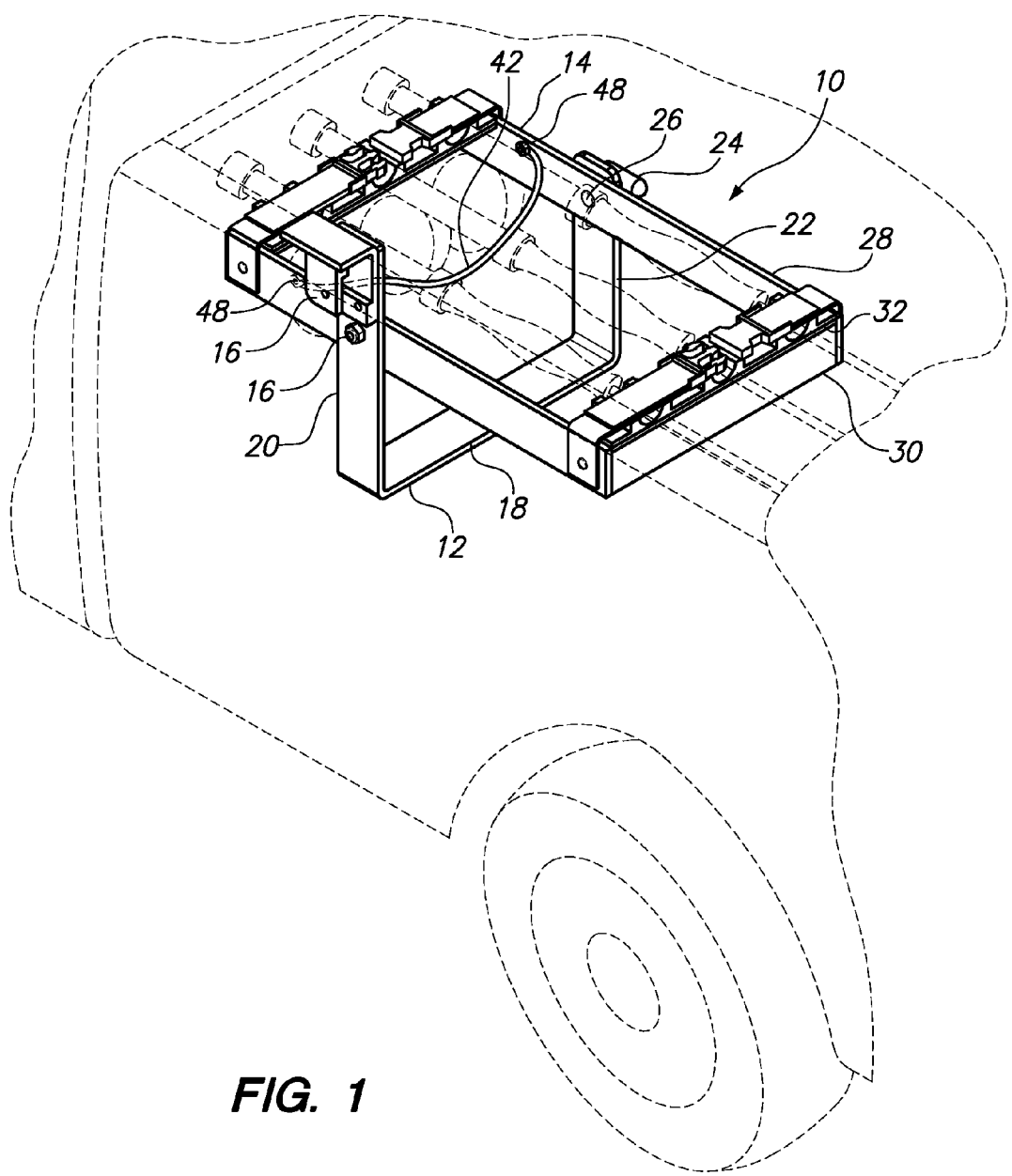
FIG. 1 is a perspective view of the fishing rod caddy of the present invention viewed from the rear end of a pickup truck bed.

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

With reference to FIGS. 1-5, the present invention fishing rod caddy 10 comprises a main support member 12, a rod carrier 14 and clamping means 16 for engaging a side of a pickup truck bed. The main support member 12 is generally in the shape of a C-channel and features a base member 18. Connected to one end of the base member 18 is an inboard or bedside vertical upright 20. Connected to the opposite end of the base member 18 is an outboard or free standing vertical upright 22. In one preferred embodiment, the main support member 12 is constructed from aluminum and is a unitary piece from formed aluminum bar stock.

The rod carrier 14 is of generally rectangular shape featuring opposing longitudinal framing members 28 connected at their ends by opposing lateral framing members 30. Top plates 32 are located adjacent to the lateral framing members 30 and like span the distance between longitudinal framing members 28. In one preferred embodiment, the rod carrier 14 is constructed from aluminum and its constituent parts may attached by welding as is known to those of skill in the art. Preferably, the welds are ground smooth and flush to create a pleasing appearance.

Figure 3A:
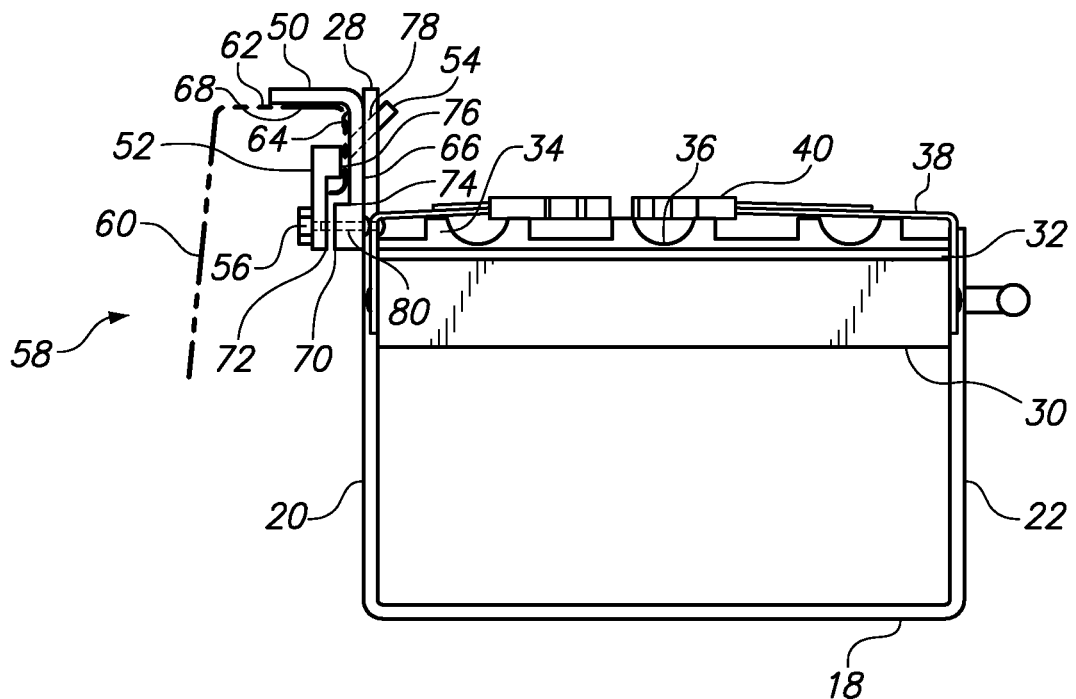
FIG. 3A is a rear end view of the fishing rod caddy of FIG. 1.

With reference to FIG. 3A, located on top of each top plate 32 is a rod support member 34. The rod support member features a plurality of u-shaped cutouts 36 for the support of multiple fishing rods, i.e. the two rod support members 34, one on top of each top plate 32, on opposing ends of the rod carrier 14, are axially aligned such that a fishing rod placed in opposing U-shaped cutouts 36 will be aligned parallel with the longitudinal members 28 of the rod carrier 14. The rod carrier 34 will preferably be made from a resilient material such as rubber or dense foam so as to protect the fishing rods from abrasion, marring, jostling or other damage that could be caused by sliding movement of the rods within the cutouts 36 of the rod support member 34.

The rods are held in the U-shaped cutouts 36 via straps 38 with quick disconnect buckles 40. The straps 38 may be made of standard web material with the buckles 40 being made of any suitable material with a non-marring plastic material being preferred. In an alternative embodiment, the rod support member 34 may comprise a band of cushioning material such as foam, soft rubber or the like, and may be substantially flat as opposed to having U-shaped cutouts.

Figure 4:
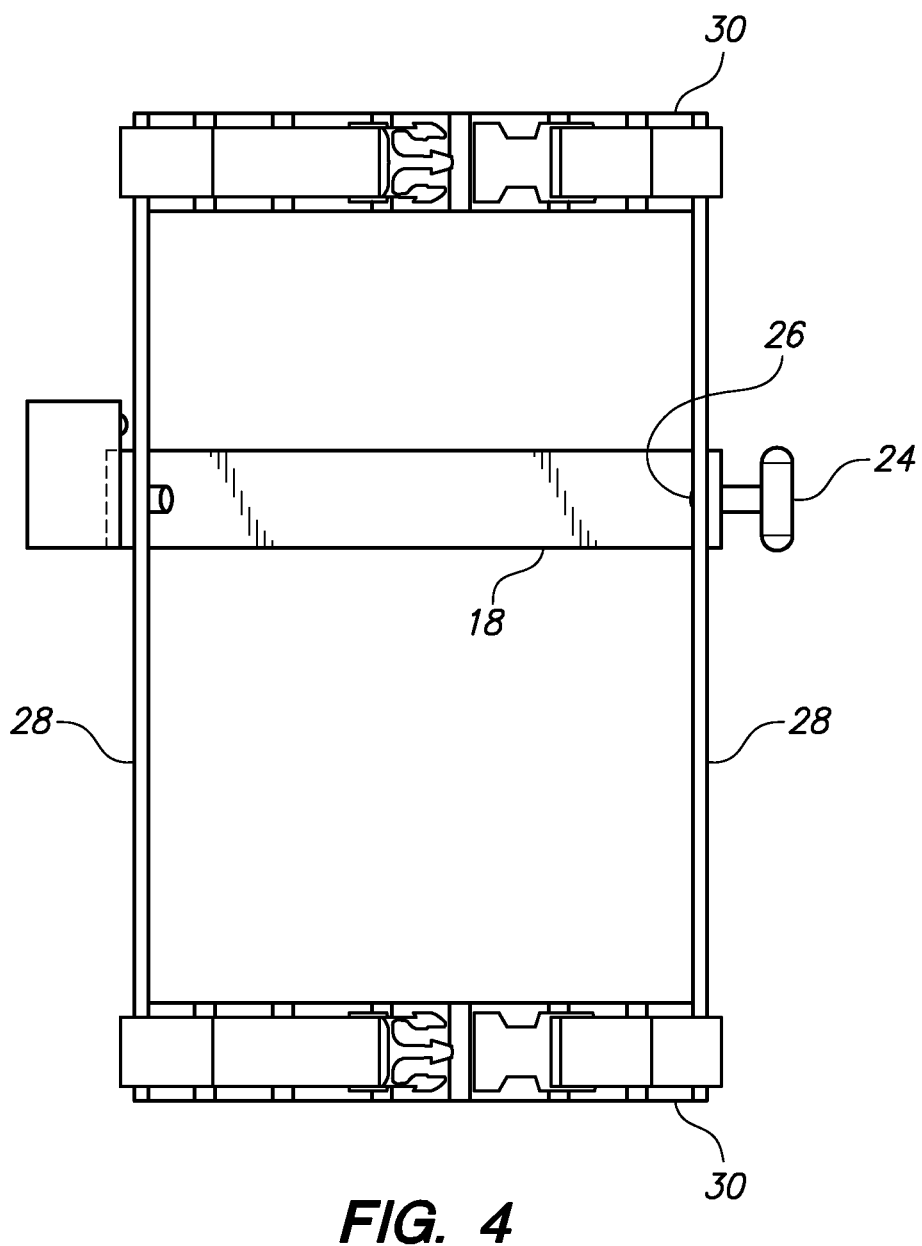
FIG. 4 is a top view of the fishing rod caddy of FIG. 4.
Figure 5:
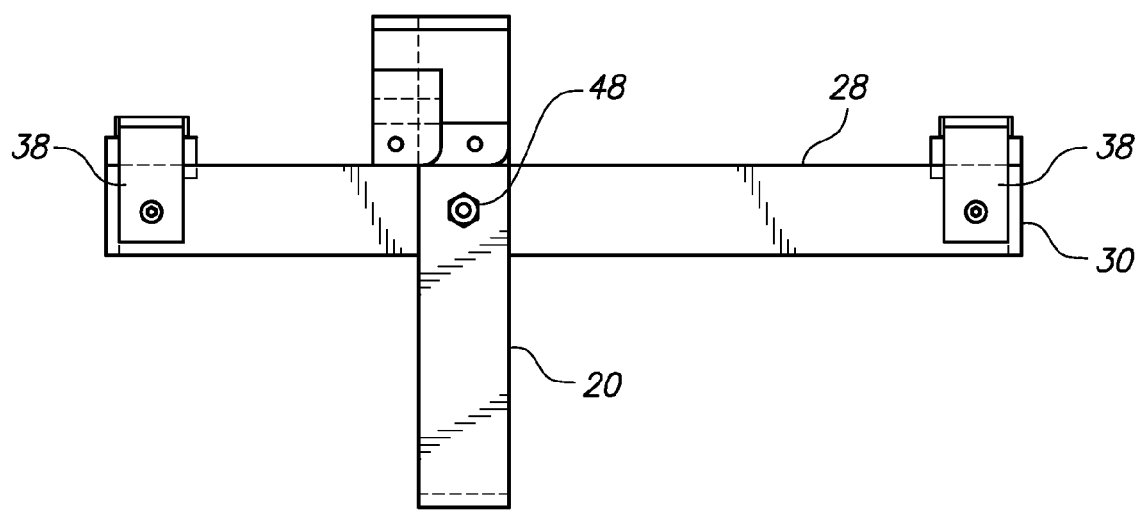
FIG. 5 is a left side view of the fishing rod caddy of FIG. 4.

With reference to FIGS. 1 and 4, the rod carrier 14 attaches to the main support at the inboard and outboard vertical uprights 20 and 22 via mechanical fasteners 48. The uprights 20 and 22 are formed with holes that alight with holes on the longitudinal framing members 28. Bolts passing through the holes attach the longitudinal framing members 28 to the vertical uprights 20 and 22. With respect to the inboard vertical upright, the bolt is made secure by means of a nut. With respect to the outboard vertical upright, a T-handle 24 equipped with a threaded insert is provided. The T-handle may be rotated counter-clockwise (in accordance with standard threading convention) so as to loosen the connection between the rod carrier 14 and the main support member 12. This allows the rod carrier 14 to be tilted at angle with respect to the pickup truck's bed if so desired by the user. Rotating the T-handle clockwise tightens the connection between the rod carrier 14 and the main support member 12 and effectively locks the rod carrier into the position (i.e. level or tilted) desired by the user. The adjustability of the rod carrier 14 is desirable so as to allow a user to slide objects underneath the caddy, or to position the stored rods in such a way as to facilitate packing a substantial amount of cargo in the pickup bed.

Figure 3B:
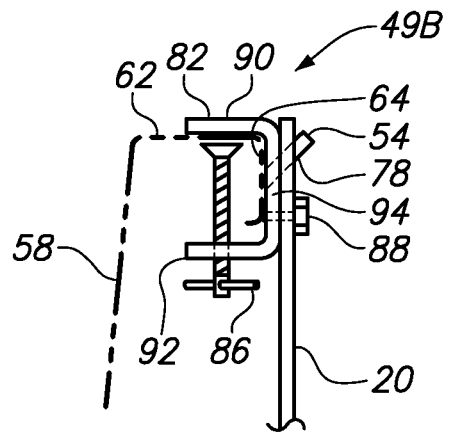
FIG. 3B is a rear detail view of the fishing rod caddy of FIG. 1.

The bed side walls 58 of a pickup truck are typically of single wall unitary construction and comprise an exterior panel 60, a top panel 62 and an inwardly facing flange 64. The exterior panel 60 of the bed wall 58 will typically be vertical or at an angle from vertical and may also found be in the form of a compound curve. The top panel 62 of a pickup bed side wall is typically flat. To provide the bed wall with increased stiffness an inwardly facing stiffening flange 64 is formed with the bed wall. The inwardly facing stiffening flange 64 is often vertical as is shown in FIGS. 3A and 3B. In the case of some vehicles, however, the stiffening flange 64 is formed with either an inwardly or more commonly an outwardly facing angle.

Figure 2:
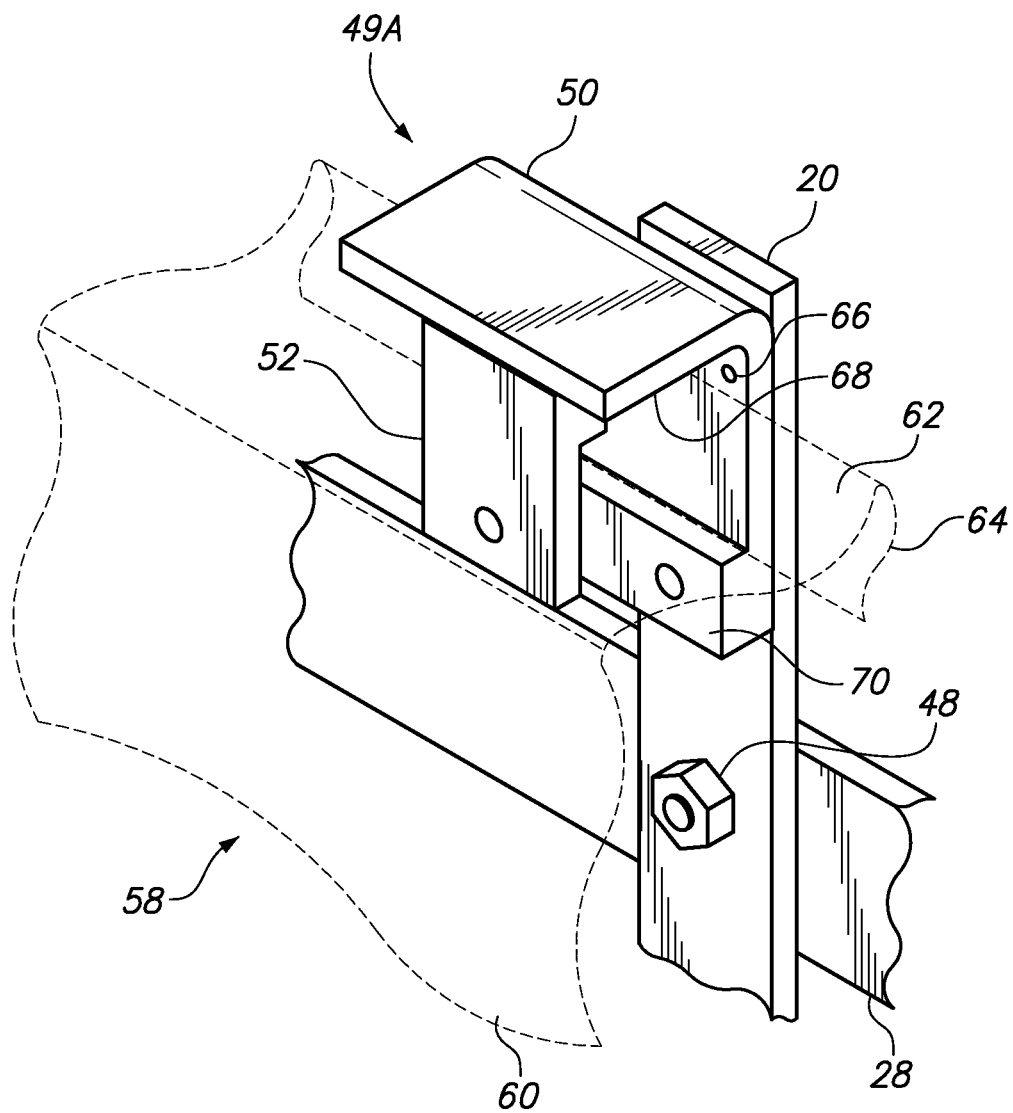
FIG. 2 is a front perspective detail view of the clamp assembly of the fishing rod caddy of FIG. 1.

The present invention fishing rod caddy may be attached to a pickup truck via a means for clamping (49A and 49B) the inboard vertical upright 20 to the side wall 58 of a truck's bed. Two embodiments are disclosed for accomplishing this function. With reference to FIGS. 2 and 3A, a clamp block embodiment 49A is shown. The clamp block embodiment 49A of the clamping means comprises and L-shaped rail block 50, a clamp block 52, an angled protrusion 54 and a mechanical fastener 56, which may comprise a bolt, nut and washer arrangement. The L-shaped rail block 50 is intended for use with truck bed side walls that have vertical stiffening flanges 65. The L-shaped block features a flat, horizontal upper member 68 for mating with the top panel 62 of the bed side wall 58 and a flat vertical member 66 which abuts the bed wall's stiffening flange 64. The rail block 50 also has a raised clamping surface 70. The clamping surface 70 has sufficient height to clear the lip 74 of truck side wall stiffening flange 64.

The angled protrusion 54 of the L-shaped rail block 50 extends upwardly at an angle with respect to the inboard vertical upright 20 and the inner surface 68 of the rail block. Measured from a reference plane normal to the inner surface 68 of the rail block, suitable angles for the protrusion 54 are within a range of about 10 degrees to 80 degrees with 45 degrees being preferred.

The clamp block 52 features a surface 72 which bears against the clamping surface 70 of the rail block 52. The clamp block 52 also features a bed wall pressure surface 76 which bears against the stiffening flange 64 of the bed wall. The pressure surface 76 is raised to provide clearance for the lip 74 of the bed wall stiffener flange 64.

The clamp block means 49A for attaching the fishing rod caddy 10 to a bed wall 58 of a pickup truck functions as follows. The angled protrusion 54 of the L-shaped rail block 50 is slid through an angled clearance hole 78 in the inboard vertical upright 20. The angled clearance hole 78 serves to locate the inboard vertical upright 20 with respect to the truck bed wall. The clamp block 52 is located against in inside of the bed wall stiffener flange 64 as shown in FIG. 3A. A mechanical fastener 56 (which may be a bolt) is passed through clearance holes 80 located in the clamp block 52, rail block 50 and the inboard vertical upright 20. In the exemplary embodiment, the mechanical fastener is a bolt, nut and washer arrangement. The bolt is preferably inserted starting from the inboard vertical upright 20 so that when fully inserted the head of the bolt abuts the vertical upright 20. The vertical upright 20, rail block 50 and clamp block 52 are then secured by means of a nut threaded onto the end of the bolt. Tightening of the nut creates pressure between the clamp block 52, the bed wall 58, and rail block 50 and thereby causes the clamping means 49A to securely attach the fishing rod caddy 10 to the bed of a pickup truck.

Referring now to FIG. 3B, an alternative clamping means 49B is shown. The alternative clamping means comprises a channel section 82. The channel section 82 is in the form of a C-channel having an upper flange 90 and lower flange 92, the upper and lower flanges being interconnected by side web 94. The inside surface of the upper flange 90 rests on the top surface 62 of the truck bed wall 58. The web 94 of the channel section 82 is sufficiently deep such that the lower flange will fit underneath and extend inwardly of the bed wall stiffening flange 64. The channel section 82 clamps to the inner surface of the top panel 62 of the bed wall via a C-clamp style screw 86. The channel section 82 also features an angled protrusion 54 that interfaces with an angled clearance hole 78 in the inboard vertical upright 20. The channel section 82 is fastened via a fastener 88 to the inboard vertical upright 20. In the exemplary embodiment, the fastener is bolt, nut and washer arrangement.

Like clamping means 49A, the angled protrusion 54 of the channel section block 82 extends upwardly at an angle with respect to the inboard vertical upright 20 and the web 94 of the channel section 82. Measured from a reference plane normal to the web 94 of the channel section 82, suitable angles for the protrusion 54 are within a range of about 10 degrees to 80 degrees with 45 degrees being preferred.

The alternative embodiment of the clamping means 49B is particularly well-suited for use with pickup trucks where the bed wall stiffening flange 64 is not vertical but is angled either outwardly or inwardly from vertical.

In a preferred installation, the fishing rod caddy 10 is intended to be oriented longitudinally within a pickup truck bed such that the handle ends of the rods face the cab of the truck and consequently the tip ends of the rods face the tailgate of the truck. Assuming this orientation, when a fishing rod is placed within the caddy 10, the handle of the rod will rest within the U-shaped cutout 36 with a portion of the handle extending outwardly from the top plate 32, i.e. towards the cab wall of the truck. (See FIG. 1.) At the same time, the reel attached to the rod will be disposed inwardly of the top plate 32. (See FIG. 1.)

In the above configuration, any vehicle decelerations which would tend to move the handle of the rod outwardly with respect to the top plate 32 will be stopped by the reel attached to the rod. To prevent the rods from falling out of the caddy 10 in response to vehicle accelerations that would tend to move the rod handles inwardly with respect to top plate 32, a bungee cord 42 is fitted under the reels at their connection to the fishing rod and is clipped to holes 44 in the sides of longitudinal framing members 28. When attached in this manner, the bungee cord 42 prevents the rods from moving inwardly upon vehicle acceleration.

If a user of the present invention rod caddy 10 were to orient the rod caddy such that rod handles faced the tailgate of the truck and the rod tips faced the cab of the truck, the bungee cord 42 will still serve its intended purpose of restraining movement of rods. If installed in this manner, the rod caddy 10 still functions as intended with the only change being the relative movement of the rods in response to vehicle accelerations and decelerations.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

What is claimed is:

1. A fishing rod caddy for supporting a plurality of fishing rods within a bed of a pickup truck, the fishing rod caddy comprising:
    a support frame having a base member, an inboard vertical upright and an outboard vertical upright;
    a rod carrier, the rod carrier having opposing longitudinal framing members, opposing lateral framing members and means for holding fishing rods, the rod carrier being pivotally connected to the support frame; and
    a clamping means, the clamping means being removably attachable to the support frame and a bed wall of the pickup truck
    wherein the means for holding fishing rods includes a first rod support member disposed parallel and adjacent to one of the lateral framing members of the rod carrier and a second rod support member disposed parallel and adjacent to the opposing lateral framing member.

2. The fishing rod caddy of claim 1, wherein each rod support member includes a plurality of cutouts for holding the plurality of fishing rods.

3. The fishing rod caddy of claim 2, wherein the cutouts of the rod support members are U-shaped.

4. The fishing rod caddy of claim 1, wherein the rod support members are made from a flat layer resilient non-marring material.

5. The fishing rod caddy of claim 1, wherein the rod carrier further includes top plates located adjacent to the lateral framing members and disposed on top of the lateral framing members and a portion of the longitudinal framing members.

6. The fishing rod caddy of claim 5, wherein the rod support members are disposed on top of the top plates.

7. The fishing rod caddy of claim 1, further comprising strap and buckle assemblies at each longitudinal end of the rod carrier wherein the straps fold over the rod support members, whereby fishing rods supported therein are prevented from bouncing out of the rod support members when the pickup truck, in which the fishing rod caddy is mounted, is in motion.

8. The fishing rod caddy of claim 1, wherein the clamping means comprises:
    an L-shaped rail block;
    an L-shaped clamp block; and
    means for removably attaching the L-shaped rail block and the L-shaped clamp block to the wall of the pickup truck.

9. The fishing rod caddy of claim 8, wherein the L-shaped rail block is configured to interface with a horizontal top panel of a pickup truck bed wall via a horizontal top member and a vertical stiffening flange of the pickup truck bed wall via a vertical member and to extend downwardly from the truck bed vertical stiffening flange a sufficient distance to extend below the stiffening flange of the truck bed wall, the L-shaped rail block further including a clamping surface for interfacing with a mating surface on the L-shaped clamp block, the L-shaped clamp block including a pressure surface for bearing against a stiffener flange portion of a truck bed wall.

10. The fishing rod caddy of claim 9, wherein the L-shaped rail block further includes an angled protrusion, the angled protrusion angled upwardly from a plane perpendicular to a vertical member of the rail block; wherein the angled protrusion mates with an angled clearance hole in the inboard vertical upright of the fishing rod caddy support frame.

11. The fishing rod caddy of claim 1, wherein the clamping means comprises a C-channel having a horizontal top section for interfacing with a top panel of the bed wall, a vertical web for interfacing with a vertical stiffening flange of the bed wall, and a horizontal lower section which extends below and inboard of the bed wall vertical stiffening flange, the lower horizontal section being threaded for receipt of a clamp screw, the clamp screw being oriented vertically so as to make a clamping connection with the top panel of the bed wall; the clamping means further including a means for removably attaching the clamping means to the fishing rod caddy.

12. The fishing rod caddy of claim 11, wherein the channel section includes an angled protrusion attached to the web of the channel section, the angled protrusion angled upwardly from a plane perpendicular to web of the channel section, wherein the angled protrusion mates with an angled clearance hole in the inboard vertical upright of the fishing rod caddy support frame, and wherein a fastener attaches the web of the channel section to the inboard vertical upright of the fishing rod caddy.

13. A fishing rod caddy for supporting a plurality of fishing rods within a bed of a pickup truck, the fishing rod caddy comprising:
   a support frame having a base member, an inboard vertical upright and an outboard vertical upright;
   a rod carrier, the rod carrier having opposing longitudinal framing members, and opposing lateral framing members;
   a pair of rod support member, one disposed parallel and adjacent to each of the lateral framing members of the rod carrier, wherein the rod support members include a plurality of cutouts for holding a plurality of fishing rods;
   the rod carrier being pivotally connected to the support frame; and
   a clamping means, the clamping means being removably attachable to the support frame and a bed wall of the pickup truck.

14. The fishing rod caddy of claim 13, further comprising strap and buckle assemblies at each longitudinal end of the rod carrier wherein the straps fold over the rod support member, whereby fishing rods supported therein are prevented from bouncing out of the rod support members when a pickup, in which the fishing rod caddy is mounted, is in motion.

15. The fishing rod caddy of claim 13, wherein the cutouts of the rod support members are U-shaped.

16. The fishing rod caddy of claim 13, wherein the clamping means comprises a C-channel having a horizontal top section for interfacing with a top panel of the bed wall, a vertical web for interfacing with a vertical stiffening flange of the bed wall, and a horizontal lower section which extends below and inboard of the bed wall vertical stiffening flange, the lower horizontal section being threaded for receipt of a clamp screw, the clamp screw being oriented vertically so as to make a clamping connection with the top panel of the bed wall; the clamping means further including a means for removably attaching the clamping means to the fishing rod caddy.

17. The fishing rod caddy of claim 13, wherein the clamping means comprises a channel section, wherein the channel section includes an angled protrusion attached to the web of the channel section, the angled protrusion angled upwardly from a plane perpendicular to the web of the channel section, wherein the angled protrusion mates with an angled clearance hole in the inboard vertical upright of the fishing rod caddy support frame, and wherein a fastener attaches the web of the channel section to the inboard vertical upright of the fishing rod caddy.

18. A fishing rod caddy for supporting a plurality of fishing rods within a bed of a truck, the fishing rod caddy comprising:
   a support frame having a base member, an inboard vertical upright and an outboard vertical upright; and
   a rod carrier, the rod carrier having opposing longitudinal framing members, and opposing lateral framing members;
   a pair of rod support members, one disposed parallel and adjacent to each of the lateral framing members of the rod carrier, wherein the rod support members include a plurality of cutouts for holding a plurality of fishing rods;
   the rod carrier being pivotally connected to the support frame;
   a clamping means, the clamping means being removably attachable to the support frame and a bed wall of the pickup truck;
   the clamping means including an angled protrusion angled upwardly from a plane perpendicular to the inboard vertical upright of the support frame, wherein the angled protrusion mates with an angled clearance hole in the inboard vertical upright of the support frame; and
   a bungee cord stretched across the interface between the fishing rods and reels to be supported in the fishing rod caddy, wherein ends of the bungee cord are clipped into holes in the opposing longitudinal framing members of the rod carrier.

19. The fishing rod caddy of claim 18, wherein the cutouts of the rod support members are U-shaped.

* * * * *